(12) United States Patent
Poggi (10) Patent No.: US 6,569,205 B1
(45) Date of Patent: May 27, 2003

(54) METHOD AND SYSTEM FOR REPORT PRESENTATION AND NAVIGATION IN A COMPUTER SYSTEM

(75) Inventor: Valerie S. Poggi, Los Altos, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/361,779

(22) Filed: Jul. 26, 1999

(51) Int. Cl.[7] .............................................. G06F 17/30
(52) U.S. Cl. ........................ 715/500; 345/854; 345/855
(58) Field of Search .......................... 707/500; 345/853, 345/854, 855; 715/500

(56) References Cited

U.S. PATENT DOCUMENTS

| | | | | |
|---|---|---|---|---|
| 5,230,072 A | * | 7/1993 | Smith et al. ................ 345/853 |
| 5,721,903 A | | 2/1998 | Anand et al. | |
| 5,748,188 A | | 5/1998 | Hu et al. | |
| 5,787,416 A | * | 7/1998 | Tabb et al. ................ 707/102 |
| 5,808,615 A | * | 9/1998 | Hill et al. .................. 345/440 |
| 5,903,478 A | * | 5/1999 | Fintel et al. ................... 703/6 |
| 6,075,530 A | * | 6/2000 | Lucas et al. ................. 345/804 |
| 6,191,786 B1 | * | 2/2001 | Eyzaguirre et al. ......... 345/853 |
| 6,252,597 B1 | * | 6/2001 | Lokuge ....................... 345/841 |
| 6,259,451 B1 | * | 7/2001 | Tesler ......................... 345/419 |
| 6,317,750 B1 | * | 11/2001 | Tortolani et al. ........... 345/853 |
| 6,384,847 B1 | * | 5/2002 | Rabenhorst ................. 345/764 |
| 6,421,066 B1 | * | 7/2002 | Sivan ......................... 345/712 |

OTHER PUBLICATIONS

Robert Cowart, Mastering Windows 3.1 (Sybex: 1993), pp. 108–112.*

* cited by examiner

Primary Examiner—Heather R. Herndon
Assistant Examiner—Charles A Bieneman
(74) Attorney, Agent, or Firm—Sawyer Law Group LLP (57) ABSTRACT

A method and system for report presentation and navigation in a computer system that includes multiple reports about multiple components. The method and system include defining relationships between the multiple reports and the multiple components, and visually representing the relationships on a currently displayed report. The method and system further include visually indicating a position of the currently displayed report among the relationships, thereby reducing user disorientation while navigating through the multiple reports.

7 Claims, 6 Drawing Sheets

METHOD AND SYSTEM FOR REPORT PRESENTATION AND NAVIGATION IN A COMPUTER SYSTEM

FIELD OF THE INVENTION

The present invention relates to graphical user interfaces, and more particularly to an improved method and system for report presentation and navigation in a computer system.

BACKGROUND OF THE INVENTION

A database system is basically a computerized record-keeping system whose overall purpose is to maintain information and to make that information available on demand. The information concerned may be anything that is deemed to be of significance to the individual or organization the system is intended to serve. The information is typically stored as a collection of tables on one or more physical devices, and is queried by a user through a database software application that retrieves and displays the information to the user.

The retrieved information may be presented to the user through a report or series of reports in various formats, such as simple tabular reports, custom reports, graphics, and sound. If the database application is self-contained (e.g., a PC application), then the reports are typically displayed by the database application itself. More advanced types of databases, however, may allow network or Internet access, in which case, the reports may be written in hypertext markup language (HTML) and therefore viewable through a standard web browser.

Complex databases include many different types of reports that include information regarding many different components. The components may be organized hierarchically where a particular component includes sub-components, which also contain sub-components, and so on, creating different components levels. The database reports are interrelated because each report can be linked to various the component levels. The interrelated reports are typically displayed one at a time with buttons and/or hyperlinks allowing the user to navigate among the various system and component level reports. Navigating down component levels in the reports is referred to as a drill down, moving up levels a drill up, and navigating between report types at the same component level as a drill across.

For any given system, the types of reports generally follow the same format and are therefore very similar in appearance. Adding to the complexity is the fact that the reports lack symmetry, meaning that each type of report may not be available for every component level. Due to the asymmetric nature of the relationships between report types and component levels and the similarity of the reports, users often loose track of their current location among the reports while navigating the reports during database analysis. In order to regain their bearings, users typically drill up to the entry levels of the reports or leave, and begin navigation again by drilling back down to the desired levels. This disorientation experienced by the users caused by traditional report presentation and navigation results in lost time and inefficient database analysis.

Accordingly, what is needed is an improved graphical user interface for report presentation and navigation. The present invention addresses such a need.

SUMMARY OF THE INVENTION

The present invention is a method and system for report presentation and navigation in a computer system that includes multiple reports about multiple components. The method and system include defining relationships between the multiple reports and the multiple components, and then visually representing the relationships on a currently displayed report. The method and system further include visually indicating the position of the currently displayed report among the relationships, thereby reducing user disorientation while navigating through the multiple reports. In a further aspect of the present invention, the user is also provided with vertical, horizontal, and diagonal report drilling capabilities, which allows the user to navigate in one jump to any report on any component level that is displayed in the visual representation.

According to the method and system of the present invention, the user is provided with a two-dimensional reference that illustrates the relationship among the reports and components, indicates the location of the currently displayed report, and provides a convenient, multidimensional way to navigate by pointing and clicking.

DETAILED DESCRIPTION

The present invention relates to an improved method and system for presenting and navigating among database reports. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
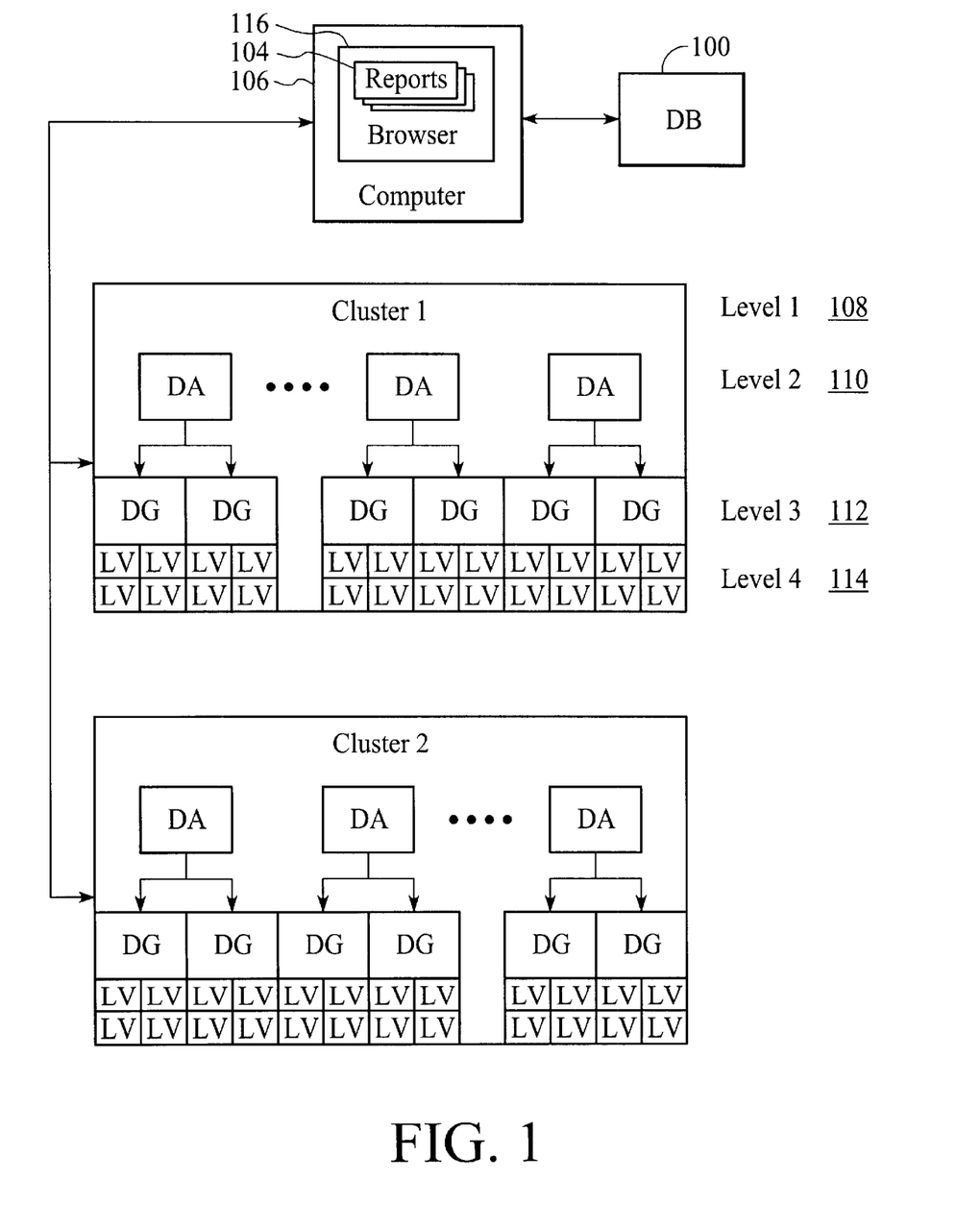
FIG. 1 is a block diagram of an example environment in which the present invention resides.

FIG. 1 is a block diagram of an example environment in which the present invention resides. A database 100 includes one or more tables maintaining information regarding components of a system. In the example, database 100 maintains performance analysis data for a large, complex database management system (DBMS) 102. Such a DBMS 102 may be used by an airline reservation system or credit card authorization system, for example. A user accesses the database data through computer 106, and the data is displayed in one or more database reports 104.

The DBMS 102 is a mirrored system in which data is written to two separate disk systems for fault tolerant operation. Each disk system comprises a cluster 108, multiple device adapters 110, multiple disk groups 112, and multiple logical volumes 114. Each cluster 108 functions as a server with a large cache for speeding data access". The device adapters 110 provide the hardware routing to the physical disks within the disk groups 112. And the logical volumes 114 map on top of each disk group 112 to function as a hard drive volume.

The DBMS 102 is very complex and may need multiple types of reports regarding the components of the system to enable a storage administrator to adequately analyze the performance characteristics of the DBMS 102. Assuming there are three types of reports 104 that may be viewed for each type of component in the DBMS 102, then the user may have to learn how to navigate twelve combinations of reports when analyzing the system.

Typically, the display of reports 104 begins at the top component levels of the system, such as at the cluster 108 level. From there the user is may choose to analyze reports for cluster 1 or cluster 2, and then navigate to the various sub-component level reports.

Figure 2A:
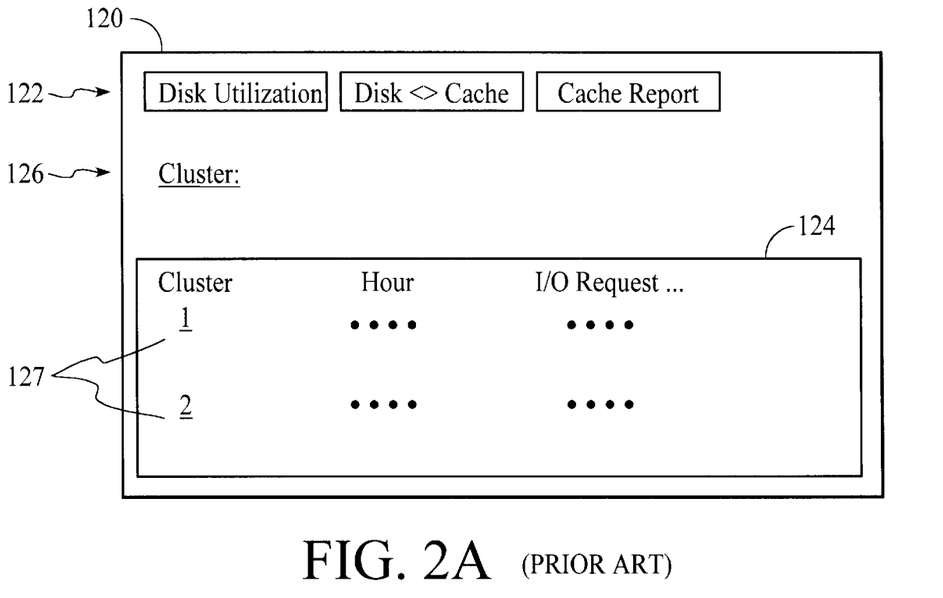
FIGS. 2A and 2B are diagrams illustrating a conventional method of report presentation and navigation for a system, such as a DBMS.
Figure 2B:
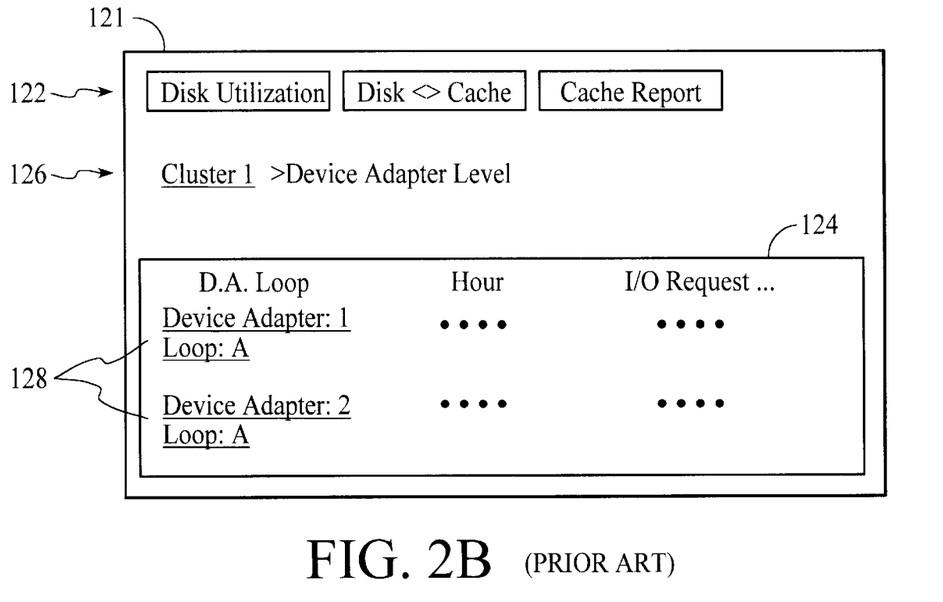

FIGS. 2A and 2B are diagrams illustrating a conventional method of report presentation and navigation for a system, such as the DBMS 102. FIG. 2A shows a report 120 including both button navigation and hyperlink navigation, although some types of reports may have only one type of navigation. In button navigation, a series of buttons 122 is displayed that represent the various types of database reports that are available for the system. In this example, the database 100 includes three types of database reports 104; a disk utilization report, a disk cache report, and a cache report. Clicking one of the buttons 122 causes data for the corresponding report to be displayed in a data area 124.

In hyperlink navigation, hierarchical hyperlinks 126 and 127 are interactively displayed that allow a user to drill up and down the various component levels. For example, in FIG. 2A, the user is displaying a cache report at the "Cluster" level 108. Hyperlinks for clusters 1 and 2 are displayed in the data area 124 along with data regarding clusters 1 and 2. The user may drill down one level to the device adapter level 110 by clicking on one of the cluster hyperlinks 127.

Referring to FIG. 2B, in response, the cache report 121 for the "Device Adapter" level 110 is displayed in the data area 124 and hyperlink 126 is updated. The user may then click one of the device adapter hyperlinks 128 to proceed to the disk group level 112 reports, or click on the cluster hyperlink 126 to drill back up a level.

Typically, reports 104 that include hyperlinks 126 are written in HTML for viewing from a web browser 116 (either on computer 106 or on a remote computer through a network, such as the Internet). However, the reports 104 may also be written in another language, such as C or C++, and displayed by a software application.

No matter how the reports 104 are generated, vertical navigation (drill up/down) among the component levels can only be done sequentially between reports corresponding to vertically adjacent components in the system hierarchy. For example, if the user is viewing a report for component level four and wants to return to the report for level one, the user must first drill up to level three, then up to two, and then up to one.

Although presenting the reports in similar formats provides consistency, it also has the drawback of making the reports look confusingly similar, particularly in complex systems whose report hierarchy is large in terms of both breadth and depth. Also, in many systems relationships between the types of reports and the component levels will lack symmetry because each type of report may not be available for every component level. Because of the similarity of the reports and the asymmetric nature of the relationships between report types and the component levels, the user may often become disoriented with respect to the location of a particular report among the report hierarchy. This results in the user having to drill up to a previously viewed level to regain orientation or to leave and restart in preparation to begin report navigation all over again. Not only is this navigation method tedious for the user, it also results in inefficient system analysis.

Figure 3:
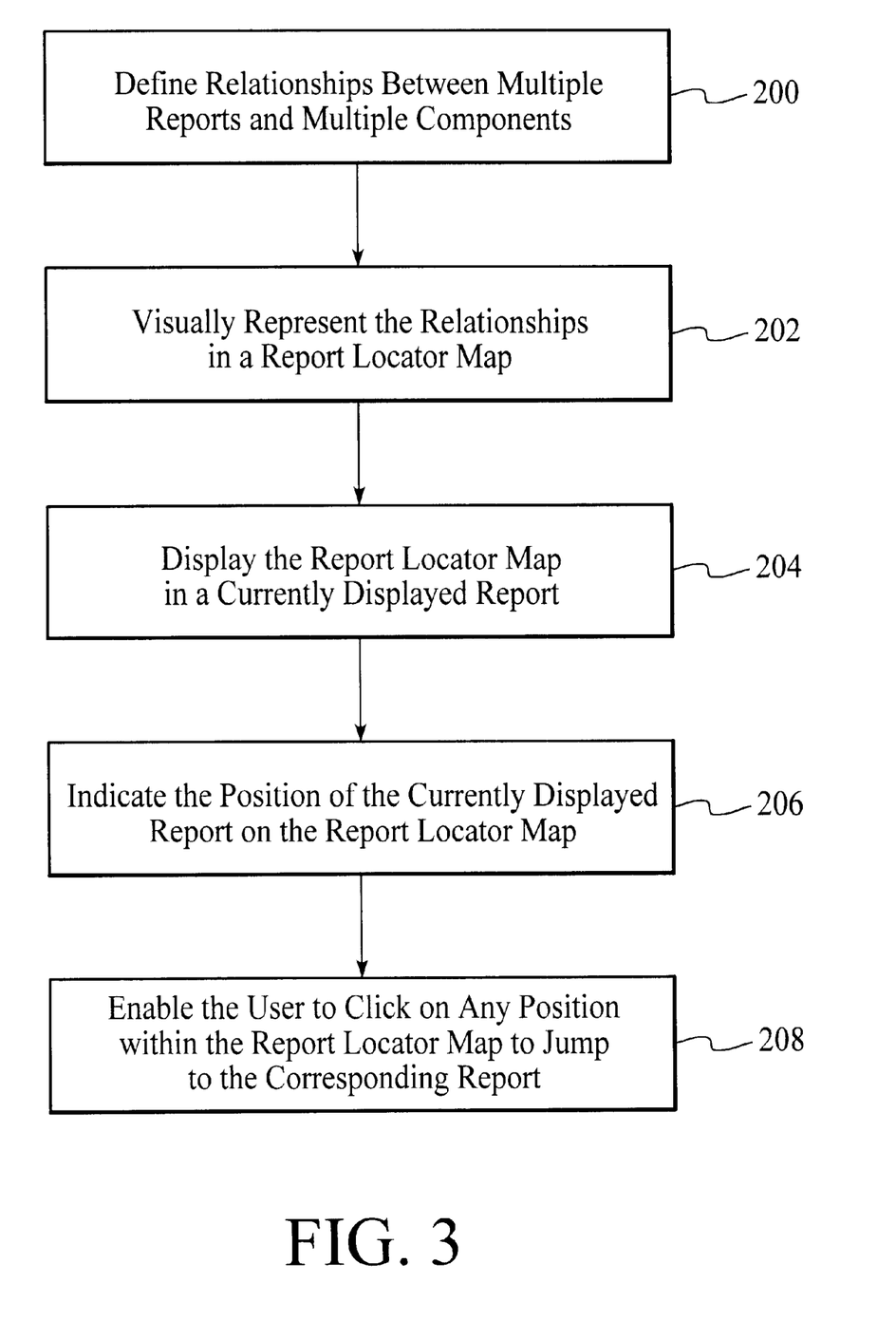
FIG. 3 is a flow chart illustrating an improved method for presenting and navigating among reports in accordance with the present invention in a system that includes multiple reports and multiple component levels.

FIG. 3 is a flow chart illustrating an improved method for presenting and navigating among reports in accordance with the present invention in a system that includes multiple reports and multiple component levels. The process begins by defining relationships between the multiple reports and the multiple components, which defines a report hierarchy in step 200. After the relationship definition is provided, the relationships are visually represented using a multidimensional report locator map in step 202.

Figure 4:
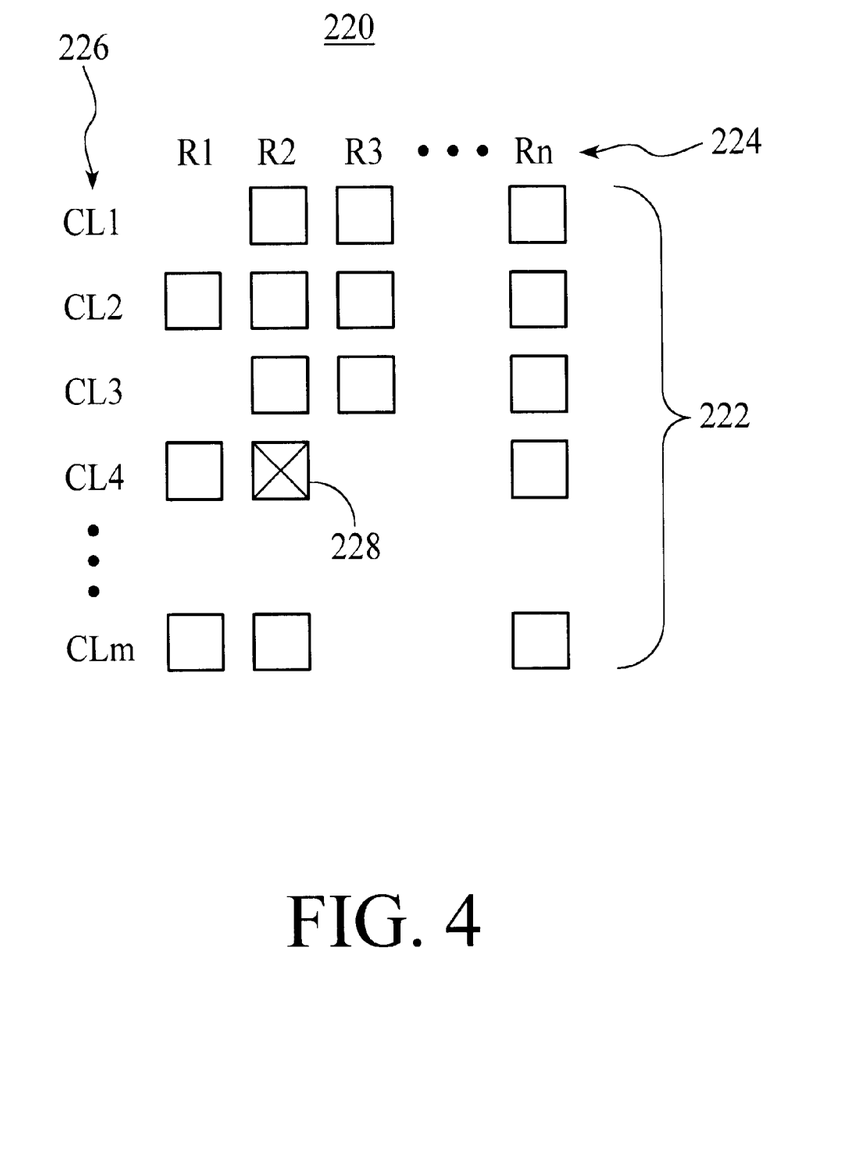
FIG. 4 is block diagram illustrating the report locator map of the present invention.

FIG. 4 is block diagram illustrating the report locator map of the present invention. The report locator map 220 is a multidimensional array of elements 222, each indexed by a report name 224 and a component level name 226. Each report name 224 represents a particular report that has been generated for the system, and each component level name 226 represents a particular component level of the system. In a preferred embodiment, the report locator map 220 is implemented as a N×M two-dimensional array, where N is the number of report types and M is the number of component levels.

The relationships between the reports and the component levels are represented by the array elements 222, where the presence of an element 222 at any given intersection indicates that the corresponding report 224 is available for the corresponding component level 226. Conversely, the absence of an element 222 at any given intersection indicates that the corresponding report 224 is not available for the corresponding component level 226.

Referring to both FIGS. 2 and 3, after the report locator map 220 is provided, the report locator map 220 is displayed on a currently displayed report in step 204. The position of the currently displayed report is then indicated on the report locator map 220 with a check, highlight or some other graphic 228 in step 206, thereby indicating the location of the current report among the report hierarchy. In a further aspect of the present invention, the user is enable to click on any element 222 within the report locator map 220 to navigate in one jump to the corresponding report, thereby providing vertical, horizontal, and diagonal report drilling capabilities, in step 208.

Figure 5:
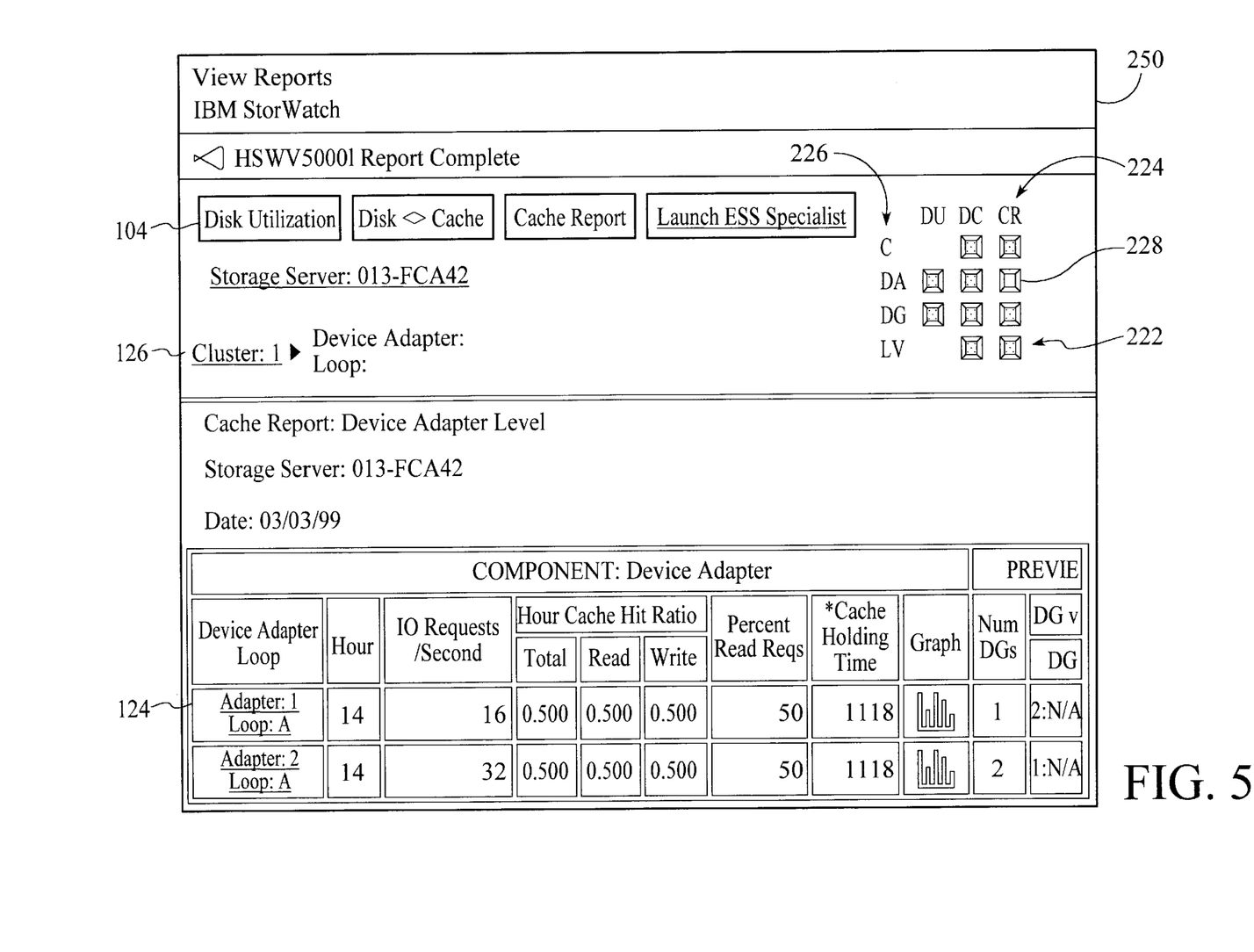
FIGS. 5 and 6 are example reports incorporating the report locator map in accordance with the present invention.
Figure 6:
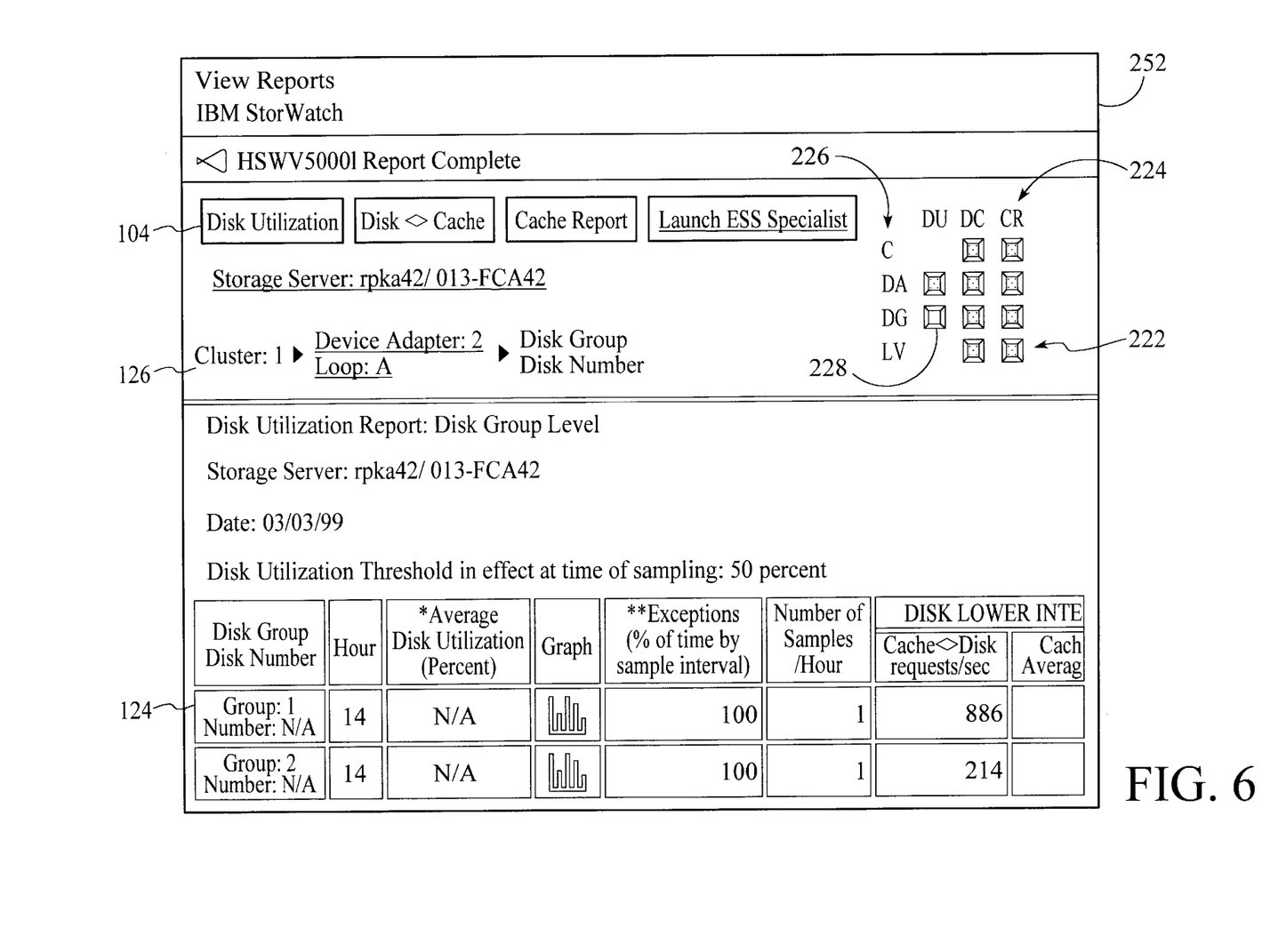

FIGS. 5 and 6 are example reports incorporating the report locator map 220 in accordance with the present invention, where like components from previous Figures have like reference numerals. FIGS. 5 and 6 continue with the example of FIGS. 2A and 2B showing reports generated by database 100 for the DBMS 102.

As in the previous example, the reports 250 and 252 in FIGS. 5 and 6, respectively, allow button navigation for the three types of database reports; disk utilization, disk cache, and the cache reports. Both reports 250 and 252 also include hyperlink navigation of the component levels, where data for the corresponding reports are displayed in data area 124.

The present invention overcomes the disorientation problems associated by the traditional presentation and navigation methods by displaying the report locator map 220 on each report 250 and 252. Abbreviations for report names 224 are displayed across the top row of the report, which are shown as "DU," "DC," and "CR". Abbreviations for the four component level names 226 are displayed along the first column, which are shown as "C," "DA," "DG," and "LV".

Referring now to FIG. 5, the relationships between the reports and the component levels are shown by the presence of array elements 222 in the report locator map 220. The absence of the array elements 222 at the intersection of "DU" and "C", and at the intersection of "DU" and "LV" instantly indicate to the user that a disk utilization report does not exist at either the cluster level 108 or the logical volume level 114 of the DBMS 102. Consequently, the configuration of the elements 222 provides the user with a visual indication of the report hierarchy.

In FIG. 5, the location of the currently displayed report 250 among the report hierarchy is indicated by the shaded box 228. The shaded box 228 lies at the intersection of "CR" and "DA," instantly indicating to the user that the current report 250 is the cache report at the device adapter level. Along with the report locator map 220, the report location is further reinforced for the user by the presence of the traditional buttons 104 and hyperlinks 126. This provides the user with both visual and text navigational aides.

After analyzing the report cache report 250, the user may navigate in one jump to any report at any given component level by clicking one of the array elements 222 in the report locator map 220. In FIG. 6, for example, the user has clicked the element 222 lying at the intersection of "DU" and "DG." This causes the disk utilization report 252 at the disk group level to be displayed, and its location among the report hierarchy indicated by the shaded box 228. By clicking on elements in the report locator map 220 in such a manner, the user is able to perform both non-sequential drill up/downs and diagonal drills.

A method and system for presenting and navigating among database reports using a report locator map has been disclosed. By representing the report hierarchy as a multi-dimensional array, the present invention significantly reduces user disorientation while navigating through multiple reports. In addition, the present invention enables a user to navigate in one jump to any report on any component level that is displayed in the report locator map.

Although the present invention has been described in accordance with the embodiments shown, one of ordinary skill in the art will readily recognize that there could be variations to the embodiments and those variations would be within the spirit and scope of the present invention. For example, although the present invention has been described in terms of a series of database reports regarding hierarchical database system components, the reports may display any type of information where definable relationships exists among the data. Accordingly, many modifications may be made by one or ordinary skill in the art without departing from the spirit and scope of the appended claims.

What is claimed is:

1. A method for providing a report presentation and navigation in a computer system that includes multiple reports about multiple components, comprising the steps of:

(a) defining relationships between the multiple reports and the multiple components;

(b) visually representing the relationships on each displayed report using a report locator map, the report locator map comprising an array of elements, wherein each element is indexed by a report name and a component level name, and wherein the relationships are represented by placing the elements at intersections in the array where a corresponding report is available for a corresponding component level;

(c) visually indicating a position of a currently displayed report among the relationships; and (d) enabling a user to click on any element within the report locator map to navigate in one jump to the corresponding report.

2. The method of claim 1 wherein step (c) further includes the step of:

indicating the position of the currently displayed report by displaying a graphic on the corresponding element.

3. A graphical user interface for report navigation in a computer system that includes multiple reports about multiple components, wherein a set of relationships exist between the multiple reports and the multiple components, comprising:

means for displaying a current report;

means for visually representing the set of relationships on each displayed report using a report locator map, the report locator map comprising an array of elements, wherein each element is indexed by a report name and a component level name, and wherein the relationships are represented by placing the elements at intersections in the array where a corresponding report is available for a corresponding component level;

means for visually indicating a position of the currently displayed report among the set of relationships; and means for enabling a user to click on any element within the report locator map to navigate in one jump to the corresponding report.

4. The system of claim 3 wherein the position of the currently displayed report is indicated by displaying a graphic on the corresponding element.

5. A computer-readable medium for providing a report presentation and navigation in a computer system that includes multiple reports about multiple components, the program instructions for:

(a) defining relationships between the multiple reports and the multiple components;

(b) visually representing the relationships on each displayed report using a report locator map, the report locator map comprising an array of elements, wherein each element is indexed by a report name and a component level name, and wherein the relationships are represented by placing the elements at intersections in the array where a corresponding report is available for a corresponding component level;

(c) visually indicating a position of the currently displayed report among the relationships; and (d) enabling a user to click on any element within the report locator map to navigate in one jump to the corresponding report.

6. The computer-readable medium of claim 5 wherein program instruction (c) further includes the program instruction of:

i) indicating the position of the currently displayed report by displaying a graphic on the corresponding element.

7. A report locator map that is displayed on reports in a computer system, comprising:

an array of elements, wherein each element is indexed by a report name and a component level name, wherein the elements are placed at intersections in the array where a corresponding report is available for a corresponding component level;

a graphic displayed on one of the elements corresponding to a currently displayed report that indicates a position of the currently displayed report among a hierarchy of reports; and means for navigating in one jump to any report displayed in the report locator map in response to a user clicking on a corresponding element within the report locator map, thereby providing drill up, drill down and drill diagonal report navigation.

* * * * *